(12) United States Patent
Glatron et al.

(10) Patent No.: US 8,606,950 B2
(45) Date of Patent: Dec. 10, 2013

(54) SYSTEM AND METHOD FOR TRANSPARENTLY PROCESSING MULTIMEDIA DATA

(75) Inventors: Arnaud Glatron, Santa Clara, CA (US); Patrick Miauton, Mountain View, CA (US); John Bateman, San Francisco, CA (US)

(73) Assignee: Logitech Europe S.A., Lausanne (CH)

( * ) Notice: Subject to any disclaimer, the term of this patent is extended or adjusted under 35 U.S.C. 154(b) by 1039 days.

(21) Appl. No.: 11/445,497

(22) Filed: May 31, 2006

(65) Prior Publication Data

US 2007/0214461 A1    Sep. 13, 2007

Related U.S. Application Data

(63) Continuation-in-part of application No. 11/241,312, filed on Sep. 29, 2005, now abandoned.

(60) Provisional application No. 60/688,838, filed on Jun. 8, 2005.

(51) Int. Cl.
 *G06F 15/16* (2006.01)

(52) U.S. Cl.
 USPC ........... 709/231; 709/205; 709/207; 345/619; 700/94

(58) Field of Classification Search
 USPC .................................................. 709/204–207
 See application file for complete search history.

(56) References Cited

U.S. PATENT DOCUMENTS 3,956,745 A    5/1976   Ellis
4,200,862 A    4/1980   Campbell et al.
4,356,509 A    10/1982  Skerlos et al.
4,386,436 A    5/1983   Kocher et al.
4,425,647 A    1/1984   Collins et al.
4,509,211 A    4/1985   Robbins (Continued)

FOREIGN PATENT DOCUMENTS

| CN | 1474267 A | 11/2004 |
|----|-----------|---------|
| DE | 100 58 175 C1 | 8/2002 |
| WO | WO 01/67759 A1 | 9/2001 |

OTHER PUBLICATIONS

Miller, Stanley A.; "Program adds 3-D faces to instant messages"; *Milwaukee Journal Sentinel*, http://www.jsonline.com/bym/tech/news/oct01/see02100101.asp, 2 pages, Oct. 1, 2011.

(Continued)

*Primary Examiner* — Ian N Moore
*Assistant Examiner* — Jackie Zuniga
(74) *Attorney, Agent, or Firm* — Kilpatrick Townsend & Stockton LLP

(57) ABSTRACT

A multimedia data processing system and method which transparently processes video and/or audio streams in real-time. The operation of a system in accordance with an embodiment of the present invention does not require any intervention from, or involvement of, either the producer of the video and/or audio stream, or the client application. With such a transparent solution, video and/or audio streams can be processed seamlessly, and completely independently of the specific client application that the user chooses to use. In one embodiment, the invention uses an external service to monitor new processes and add code to these processes. The invention inserts into the system by hot-patching the software in memory and by only looking at select service calls.

34 Claims, 10 Drawing Sheets

(56) References Cited

U.S. PATENT DOCUMENTS

| | | | |
|---|---|---|---|
| 4,517,564 A | 5/1985 | Morishita et al. |
| 4,535,333 A | 8/1985 | Twardowski |
| 4,566,034 A | 1/1986 | Harger et al. |
| 4,623,887 A | 11/1986 | Welles |
| 4,626,847 A | 12/1986 | Zato |
| 4,626,848 A | 12/1986 | Ehlers |
| 4,703,359 A | 10/1987 | Rumbolt et al. |
| 4,712,105 A | 12/1987 | Kohler |
| 4,718,112 A | 1/1988 | Shinoda |
| 4,746,919 A | 5/1988 | Reitmeier |
| 4,769,643 A | 9/1988 | Sogame |
| 4,771,283 A | 9/1988 | Imoto |
| 4,774,511 A | 9/1988 | Rumbolt et al. |
| 4,794,371 A | 12/1988 | Yamamoto |
| 4,807,052 A | 2/1989 | Amano |
| 4,825,200 A | 4/1989 | Evans et al. |
| 4,841,368 A | 6/1989 | Rumbolt et al. |
| 4,855,746 A | 8/1989 | Stacy |
| 4,856,081 A | 8/1989 | Smith |
| 4,860,380 A | 8/1989 | Mengel |
| 4,866,434 A | 9/1989 | Keenan |
| 4,918,439 A | 4/1990 | Wozniak et al. |
| 4,959,810 A | 9/1990 | Darbee et al. |
| 5,228,077 A | 7/1993 | Darbee |
| 5,255,313 A | 10/1993 | Darbee |
| 5,414,426 A | 5/1995 | O'Donnell et al. |
| 5,414,761 A | 5/1995 | Darbee |
| 5,552,917 A | 9/1996 | Darbee et al. |
| 5,659,692 A | 8/1997 | Poggio et al. |
| 5,689,353 A | 11/1997 | Darbee et al. |
| 5,689,575 A | 11/1997 | Sako et al. |
| 5,764,306 A | 6/1998 | Steffano |
| 5,768,126 A | 6/1998 | Frederick |
| 5,825,941 A | 10/1998 | Linford et al. |
| 5,850,463 A | 12/1998 | Hori |
| 5,959,751 A | 9/1999 | Darbee et al. |
| 6,016,148 A | 1/2000 | Kang et al. |
| 6,064,383 A | 5/2000 | Skelly |
| 6,069,622 A | 5/2000 | Kurlander |
| 6,130,726 A | 10/2000 | Darbee et al. |
| 6,163,322 A | 12/2000 | LaChapelle |
| 6,222,939 B1 | 4/2001 | Wiskott et al. |
| 6,272,231 B1 | 8/2001 | Maurer et al. |
| 6,301,370 B1 | 10/2001 | Steffens et al. |
| 6,356,659 B1 | 3/2002 | Wiskott et al. |
| 6,400,374 B2 | 6/2002 | Lanier |
| 6,453,294 B1 | 9/2002 | Dutta et al. |
| 6,466,695 B1 | 10/2002 | Potzsch et al. |
| 6,545,682 B1 | 4/2003 | Ventrella et al. |
| 6,580,811 B2 | 6/2003 | Maurer et al. |
| 6,593,950 B2 | 7/2003 | Nomura et al. |
| 6,606,096 B2 | 8/2003 | Wang |
| 6,629,793 B1 | 10/2003 | Miller |
| 6,724,339 B2 | 4/2004 | Conway et al. |
| 6,728,964 B1 | 4/2004 | Butt |
| 6,747,591 B1 | 6/2004 | Lilleness et al. |
| 7,209,577 B2 | 4/2007 | McAlpine et al. |
| 7,397,932 B2 | 7/2008 | McAlpine et al. |
| 2001/0033675 A1 | 10/2001 | Maurer et al. |
| 2003/0001854 A1* | 1/2003 | Jade et al. ............ 345/581 |
| 2003/0018796 A1* | 1/2003 | Chou et al. ............ 709/231 |
| 2003/0043153 A1 | 3/2003 | Buddemeier et al. |
| 2003/0156134 A1 | 8/2003 | Kim |
| 2003/0198384 A1 | 10/2003 | Vrhel |
| 2003/0202686 A1 | 10/2003 | Rowe |
| 2003/0206171 A1 | 11/2003 | Kim et al. |
| 2003/0235341 A1 | 12/2003 | Gokturk et al. |
| 2004/0085324 A1 | 5/2004 | Yao |
| 2004/0117632 A1 | 6/2004 | Arling et al. |
| 2004/0174996 A1 | 9/2004 | Tewfik et al. |
| 2004/0201666 A1 | 10/2004 | Matsuo et al. |
| 2004/0230806 A1* | 11/2004 | Lisanke ............ 713/182 |
| 2004/0239689 A1 | 12/2004 | Fertig et al. |
| 2005/0026685 A1 | 2/2005 | Ruark et al. |
| 2005/0041867 A1 | 2/2005 | Loy et al. |
| 2005/0083339 A1 | 4/2005 | Wilt et al. |
| 2005/0086501 A1* | 4/2005 | Woo et al. ............ 713/189 |
| 2005/0163379 A1 | 7/2005 | Zimmermann |
| 2005/0204289 A1 | 9/2005 | Mohammed et al. |
| 2005/0246163 A1* | 11/2005 | Ono et al. ............ 704/200 |

OTHER PUBLICATIONS

"Synthetic Video communication: Server-based Mobile Services"; http://www.seestorm.com/application/mobile, 2 pages, Oct. 31, 2004.

"Synthetic Video communication: SeeStorm Mobile 2.0"; http://www.seestorm.com/products/mobile, 2 pages, Oct. 31, 2004.

Miller, Stanley A.; "Program adds 3-D faces to instant messages", *Milwaukee Journal Sentinel*, http://www.jsonline.com/bym/tech/news/oct01/see02100101.asp, 2 pages, Oct. 1, 2011.

Search/Examination Report dated Oct. 22, 2008 from German Patent Application No. 102006026725.7 together with English language translation, 10 pages.

\* cited by examiner

SYSTEM AND METHOD FOR TRANSPARENTLY PROCESSING MULTIMEDIA DATA

CROSS-REFERENCES TO RELATED APPLICATIONS

This application claims priority from provisional application No. 60/688,838, entitled "System and Method for Transparently Processing Multimedia Data", filed on Jun. 8, 2005 and is a continuation-in-part of application Ser. No. 11/241,312, filed on Sep. 29, 2005, entitled "System and Method for Transparently Processing Multimedia Data," both of which are hereby incorporated herein in their entirety. Related applications of the same assignee are patent application Ser. No. 11/183,179, entitled "Facial Features-Localized and Global Real-Time Video Morphing", filed on Jul. 14, 2005; and patent application Ser. No. 10/767,132, entitled "Use of Multimedia Data for Emoticons In Instant Messaging", filed on Jan. 28, 2004, all of which are hereby incorporated herein in their entirety.

BACKGROUND OF THE INVENTION

1. Field of the Invention

The present invention relates in general to multimedia data processing, and specifically to a user mode multimedia processing layer for intelligently and transparently processing multimedia streams in real-time.

2. Background of Invention

Over the past few years, contact established by people with each other electronically has increased tremendously. Various modes of communication are used to electronically communicate with each other, such as emails, text messaging, etc. In particular, real-time video and audio communication (e.g., IM chats including video and/or audio) have become widely prevalent.

For purposes of video and audio real-time chats, cameras (often called webcams) are often connected to a user's computer, and the video and/or audio data captured by the camera is transmitted to the computer. Several options exist for the user to transmit still image, video and/or audio data, such as Instant Messaging (IM), live video streaming, video capture for purposes of creating movies, video surveillance, internet surveillance, internet webcams, etc. Various client applications are available on the market for such uses. For instance, for Instant Messaging alone, a user can choose from one of several applications, including MSN® Messenger from Microsoft Corporation (Redmond, Wash.), ICQ from ICQ, Inc., America OnLine Instant Messenger (AIM) from America Online, Inc. (Dulles, Va.), and Yahoo!® Instant Messenger from Yahoo! Inc. (Sunnyvale, Calif.).

Users often desire to alter the video and/or audio streams in certain ways. Such modifications may be desirable for various reasons. For instance, a user may want to look and/or sound like someone else (e.g., like some famous personality, some animated character, etc.). Another example is when a user simply wishes to be unrecognizable in order to maintain anonymity. Yet another example is when a user wants to look like a better version of himself (e.g., the user may not be dressed up for a business meeting, but he wants to project a professional persona). Still another example is when a user wants to create video/audio special effects. For these and various other reasons, users often wish to modify the video/audio stream actually captured by their webcam and/or microphone. In one example, users have an avatar which they choose. Published US application 20030043153 describes a system for modifying avatars.

Conventional video and audio processing systems are not capable of automatically and transparently performing the appropriate processing functions that may be required for such modification. Existing systems are largely non-transparent, requiring downstream applications to be configured in order to take advantage of video/audio modification capabilities. It is commonly the case that a processing component needs to be integrated into the client application in order to implement such modifications. These processing components are application specific. Alternately, a third-party component needs to be used to proactively add the processed output to the system stream. Yet another alternative is to introduce the video/audio modification capabilities in the driver for the multimedia data capturing device itself. However, the client application would still need to elect to have the effect applied, and the driver for each device would have to be customized to incorporate that functionality. Moreover, advanced processing is not possible in the driver because that environment lacks the proper services needed for such advanced processing. Further, anything in the driver is very static and requires a lot of testing to guarantee system stability, making it nearly impossible to provide a flexible and expandable architecture in the driver. In addition, if the processing functionality is in the driver, backward compatibility with existing devices and drivers cannot be achieved unless a new driver for the device is downloaded by the user.

What is needed is a system and method that can transparently modify still image, video and/or audio streams in real-time, independently of the specific client application that is used, and without needing to modify the device driver.

BRIEF SUMMARY OF THE INVENTION

The present invention is a multimedia data processing system and method which transparently processes video and/or audio streams in real-time. The operation of a system in accordance with an embodiment of the present invention does not require any intervention from, or involvement of, either the producer of the video and/or audio stream, or the client application. With such a transparent solution, video and/or audio streams can be processed seamlessly, and completely independently of the specific client application that the user chooses to use. Thus a system in accordance with some embodiments of the present invention can be used with any client application of the user's choice. This allows the creation of a large number of video and/or audio effects and/or improvements to the benefit of the end-user.

In one embodiment, the processing of the multimedia data is performed by a User Mode Video Processing Layer (UMVPL) or a User Mode Audio Processing Layer (UMAPL). In one embodiment, the UMVPL or UMAPL is located on a multimedia data pathway between a multimedia source or sink and a client application. The Processing Layer is located in the user-mode, rather than in the kernel mode. The kernel is a very restrictive and touchy environment, and it lacks many of the services needed to apply advanced effects, especially for video. In addition it is easy to crash the system in the kernel; the user-mode environment is much safer. Furthermore, when in user-mode, the video and/or audio stream can be altered for each process. Thus the user can introduce a different set of effects for each individual process (application) or only choose to have effects in one process (application) while the other processes stay unaffected. Finally, the entrance to kernel mode for multimedia streams is very localized and thus it can be intercepted. When the code is in the kernel it becomes much harder to intercept.

In one embodiment, a system in accordance with an embodiment of the present invention includes a Process Creation Monitor, and an Injector Service, along with the UMVPL or UMAPL. The Process Creation Monitor monitors each process created, and notifies the Injector Service. This Injector Service then injects a library of injector hooks (Injector Hook DLL) into each process. These hooks, in turn, reroute each process via the UMVPL or UMAPL before the multimedia data reaches its destination.

In one embodiment, the source of the multimedia data could be the user's devices (such as a webcam, a microphone, etc.), and the destination could be the client application. In another embodiment, the direction of the multimedia data streaming could be from the client application to the user's devices (e.g., video output device (recording deck for example), speakers, etc.)

In one embodiment, the invention uses an external service to monitor new processes and add code to these processes. The invention inserts into the system by hot-patching the software in memory and by only looking at select service calls. This solution is thus generic. The system can apply a chain of effects.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and has not been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

Reference will now be made in detail to several embodiments of the present invention. Although reference will be made primarily to implementation of a transparent video/audio processing system in a Windows environment for multimedia devices using the standard Windows Kernel Streaming protocol, one of skill in the art knows that the same concepts can be implemented in any of a variety of operating environments including a Linux, Mac OS, or other proprietary or open operating system platform including real-time operating systems. It should also be noted that while some embodiments are discussed in the context of video processing, these embodiments are also applicable to any type of multimedia processing (e.g., audio, still pictures, etc.). Further, it is to be noted that while some embodiments are discussed with the source of the multimedia being the user's device(s) and the sink being a client application, the data flow could be reversed in these embodiments.

Figure 1:
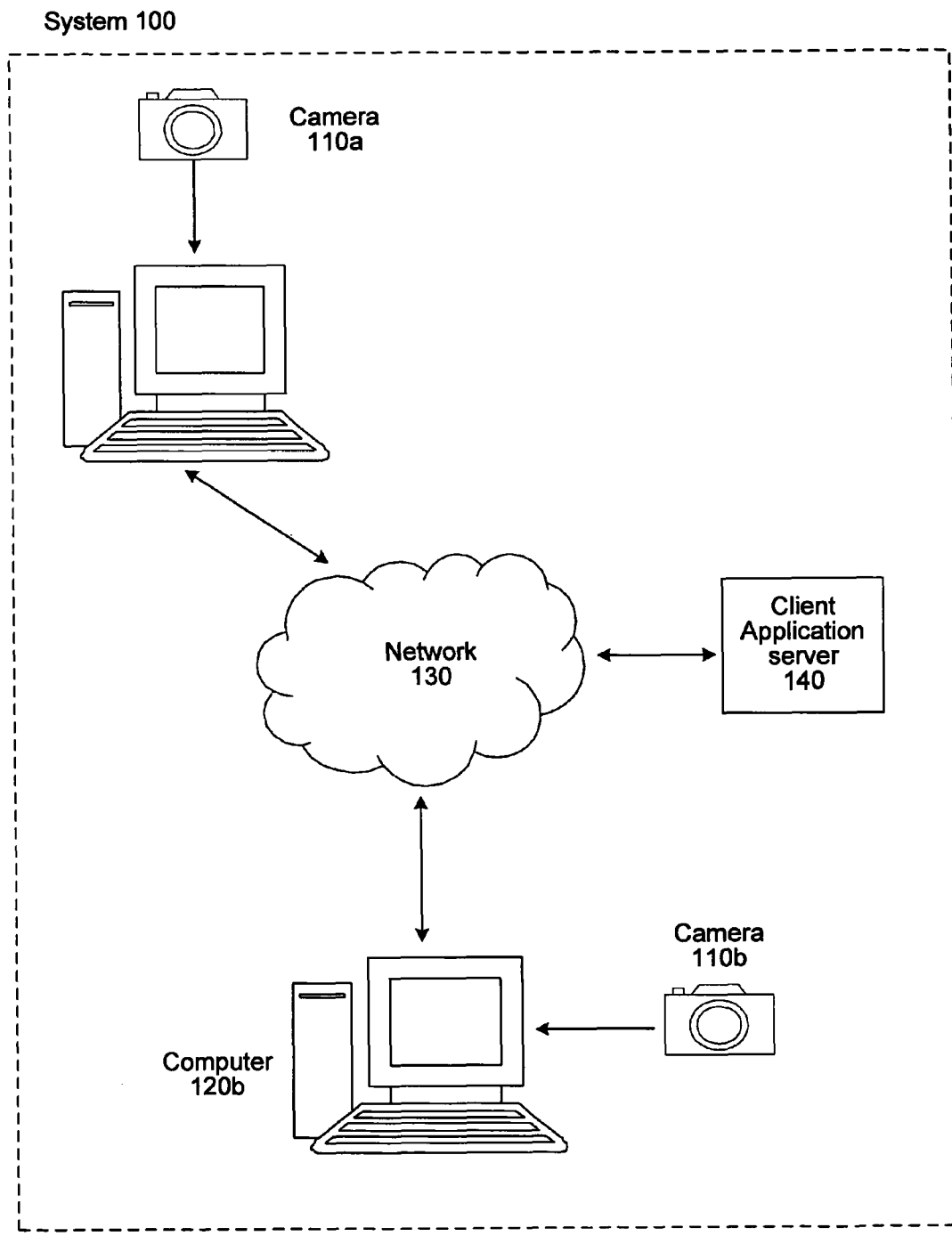
FIG. 1 is a block diagram illustrating how a video/audio capturing device connected to a host may use a client application to communicate with another similar setup over a network

FIG. 1 is a block diagram illustrating how a video/audio capturing device connected to a host may use a client application to communicate with another similar setup over a network. Such a conventional system may be used by users to transmit multimedia information to each other. System 100 comprises data capture devices 10*a* and 10*b*, computer systems 120*a* and 120*b*, a network 130, and a client application server 140.

Data capture devices 110*a* and 110*b* can be any such devices connectable to computer systems 120*a* and 120*b* which can capture some type of multimedia data (e.g., video, audio, and/or still image). For instance, data capture devices 10*a* and 10*b* can be webcams, digital still cameras, microphones, etc. In one embodiment, the data capture devices 110*a* and/or 110*b* are QuickCam® webcams from Logitech, Inc. (Fremont, Calif.).

The hosts 120*a* and 120*b* are conventional computer systems, that may each include a computer, a storage device, a network services connection, and conventional input/output devices such as, a display, a mouse, a printer, and/or a keyboard, that may couple to a computer system. In one embodiment, the computer also includes a conventional operating system, an input/output device, and network services software. In addition, in one embodiment, the computer includes client application software which may communicate with the client application server 140. The network service connection includes those hardware and software components that allow for connecting to a conventional network service. For example, the network service connection may include a connection to a telecommunications line (e.g., a dial-up, digital subscriber line ("DSL"), a T1, or a T3 communication line). The host computer, the storage device, and the network services connection, may be available from, for example, IBM Corporation (Armonk, N.Y.), Sun Microsystems, Inc. (Palo Alto, Calif.), or Hewlett-Packard, Inc. (Palo Alto, Calif.).

The network 130 can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 120 may also include commercially available subscription-based services such as, for example, AOL from America Online, Inc. (Dulles, Va.) or MSN from Microsoft Corporation (Redmond, Wash.).

Some client applications require a client server 140. Client applications are discussed below with reference to FIG. 2A.

Figure 2A:
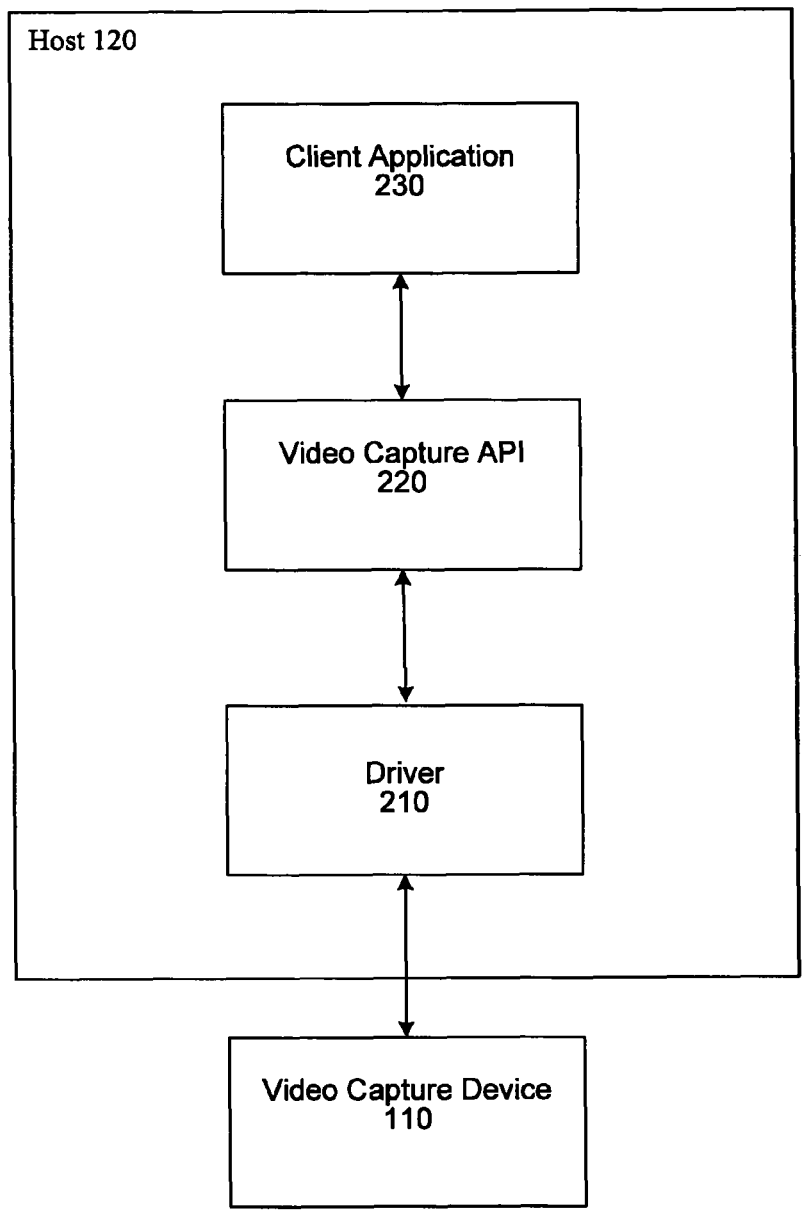
FIG. 2A illustrates one embodiment of one side of a system from FIG. 1.

FIG. 2A illustrates one embodiment of one side of system 100 described above. As discussed above, this is comprised of a data capture device 110, and a host 120. For ease of discussion, the following discussion refers to capture and processing of video data. As mentioned above, it is to be noted that other types of multimedia data (e.g., audio and still image data) is also be processed in similar manners in various embodiments. In one embodiment, the driver 210 needed by the data capture device, a video capture Application Program Interface (API) 220, and the client application 230 which the user chooses to use, reside on the host 120.

The data capture device 110 and the host 120 have been described above with reference to FIG. 1. The driver 210 is a program that controls the data capture device 110. The driver 210 may come with the operating system on the host 120, or may need to be downloaded from the Internet, or from a CD accompanying the data capture device 110, etc. The driver 210 acts as a translator between the video capture device 110 and the operating system on the host 120. Each video capture device 110 has its own set of specialized commands that only its driver 210 knows. On the other hand, most operating systems access video capture device 110 by using generic commands. The driver 210 therefore needs to accept generic commands from the operating system on the host 120, and translate them into specialized commands that the video capture device 110 can understand. The driver 210 also acts an interface between the video capture device 110 and the video capture API 220 that uses the data capture device 110.

The video capture API 220 is a way of achieving abstraction between the driver 210 and the client application 230. In one embodiment, the video capture API 220 is DirectShow from Microsoft Corporation (Redmond, Wash.). In another embodiment, the video capture API 220 is Video for Windows (VFW) also from Microsoft Corporation (Redmond, Wash.). In yet another embodiment, the video capture API 220 is the Real-Time Communications (RTC) stack, from Microsoft Corporation (Redmond, Wash.).

The client application 230 can be any program which uses the video capture device 110. For instance, in one embodiment, the client application 230 is an Instant Messenger (IM). Some examples of currently available IM programs are MSN® Messenger from Microsoft Corporation (Redmond, Wash.), America OnLine Instant Messenger (AIM) from America Online, Inc. (Dulles, Va.), and Yahoo!® Instant Messenger from Yahoo! Inc. (Sunnyvale, Calif.). In another embodiment, the client application 230 is a Video Conferencing application, such as NetMeeting from Microsoft Corporation (Redmond, Wash.). In yet another embodiment, the client application 230 is an audio communication application, such as Skype from Skype Group (Luxembourg).

Figure 2B:
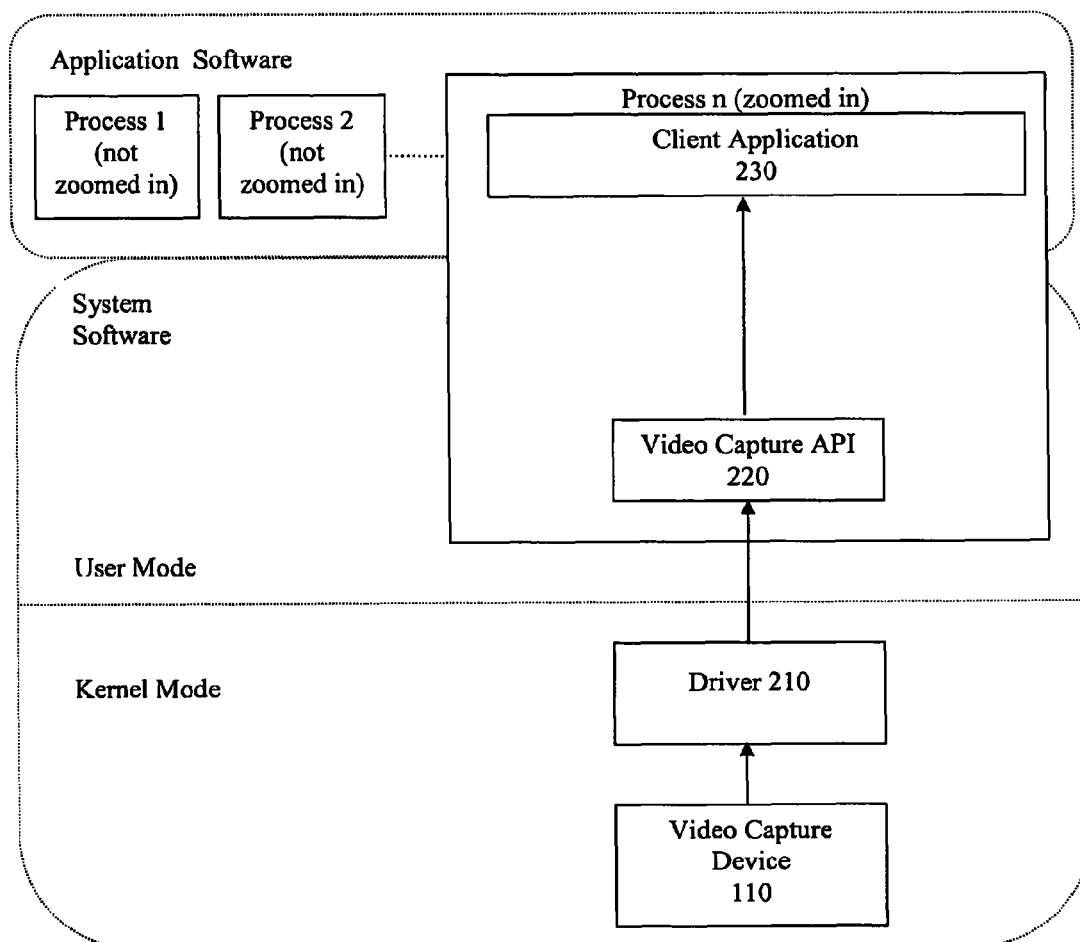
FIG. 2B is a block diagram illustrating the data flow in a system described above with reference to FIG. 2A.

FIG. 2B is a block diagram illustrating the data flow in a system described above with reference to FIG. 2A. Different processes 1 through n are illustrated in FIG. 2B.

In the embodiment illustrated in this figure, video data is captured by the data capture device 110, passed on to the driver 210, on to the video capture API 220, and then passed on to the client application 230. It is to be noted, as mentioned above, that flow of data may also be in the reverse direction—that is, from the client application 230 to an output device (e.g., recording device attached to the host 120).

It can be seen that a distinction is drawn between the user mode and the kernel mode. These are discussed in more detail with reference to FIG. 3B.

Figure 3A:
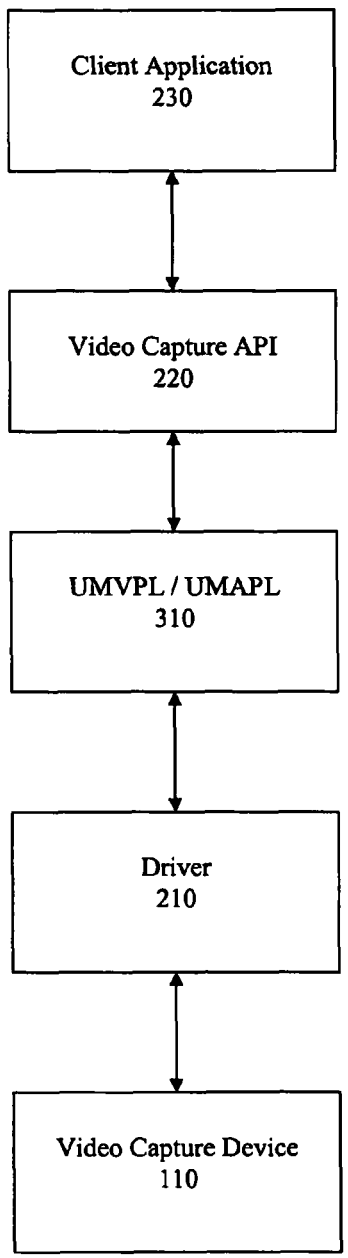
FIG. 3A is a block diagram illustrating a system in accordance with an embodiment of the present invention.

FIG. 3A is a block diagram illustrating a system in accordance with an embodiment of the present invention. It is comprised of a video capture device 110, a driver 210, a User Mode Video Processing Layer (UMVPL) 310, a video capture API 220, and a client application 230.

The data capture device 110, the driver 210, the video capture API 220, and the client application 230 have been described above. By comparing FIG. 3A to FIG. 2A, it can be seen that the UMVPL 310 is a new layer. In one embodiment, the UMVPL 310 is inserted between the driver 210 and the client application 230. Positioned between the data source 110 and the client application 230, the UMVPL 310 is configured to transparently process the data streams. This allows the client application 230 to remain unaware of the original format/content of data streams from the data source 110. A system in accordance with an embodiment of the present invention can thus accept a variety of formats and content, and process and/or modify multimedia data as desired by the user.

It is to be noted that the discussion relating to the UMVPL 310 is also applicable to multimedia data other than video data. For instance, a User Mode Audio Processing Layer (UMAPL) will function very similarly, with modifications obvious to one skilled in the art.

In one embodiment where audio data is to be modified, the UMVPL 310 can be replaced by a UMAPL (User Mode Audio Processing Layer). In another embodiment, the UMVPL 310 can be supplemented by a UMAPL. The UMVPL/UMAPL is where the data stream is modified as desired by the user. This makes video/audio more attractive and more fun to use. For instance, the UMVPL 310 can perform color correction, image distortions and alterations, color keying, video avatars, face accessories, stream preview, spoofing, or any special effect desired affecting the video data stream (e.g., adding rain-drop effect) etc. The UMAPL can perform, for instance, channel mixing, silence buffer, noise suppression, noise cancellation and notch filtering, distortion, morphing, spoofing or any special effect desired affecting the audio data stream. In one embodiment, a user can enter his or her preferences for the types of processing to be performed on various types of streams, through a graphical user or other interface.

In one embodiment, an interface is defined to allow $3^{rd}$ parties to develop components or plug-ins for proprietary processing frameworks. In one embodiment, the $3^{rd}$ party implementations are independent from the platform on which they will run. In one embodiment, plug-ins can register one or more video and/or audio effects with the UMVPL 310. Thus the UMVPL 310 can be used to enable the concept of plug-ins to apply to transparent video and/or processing.

Figure 3B:
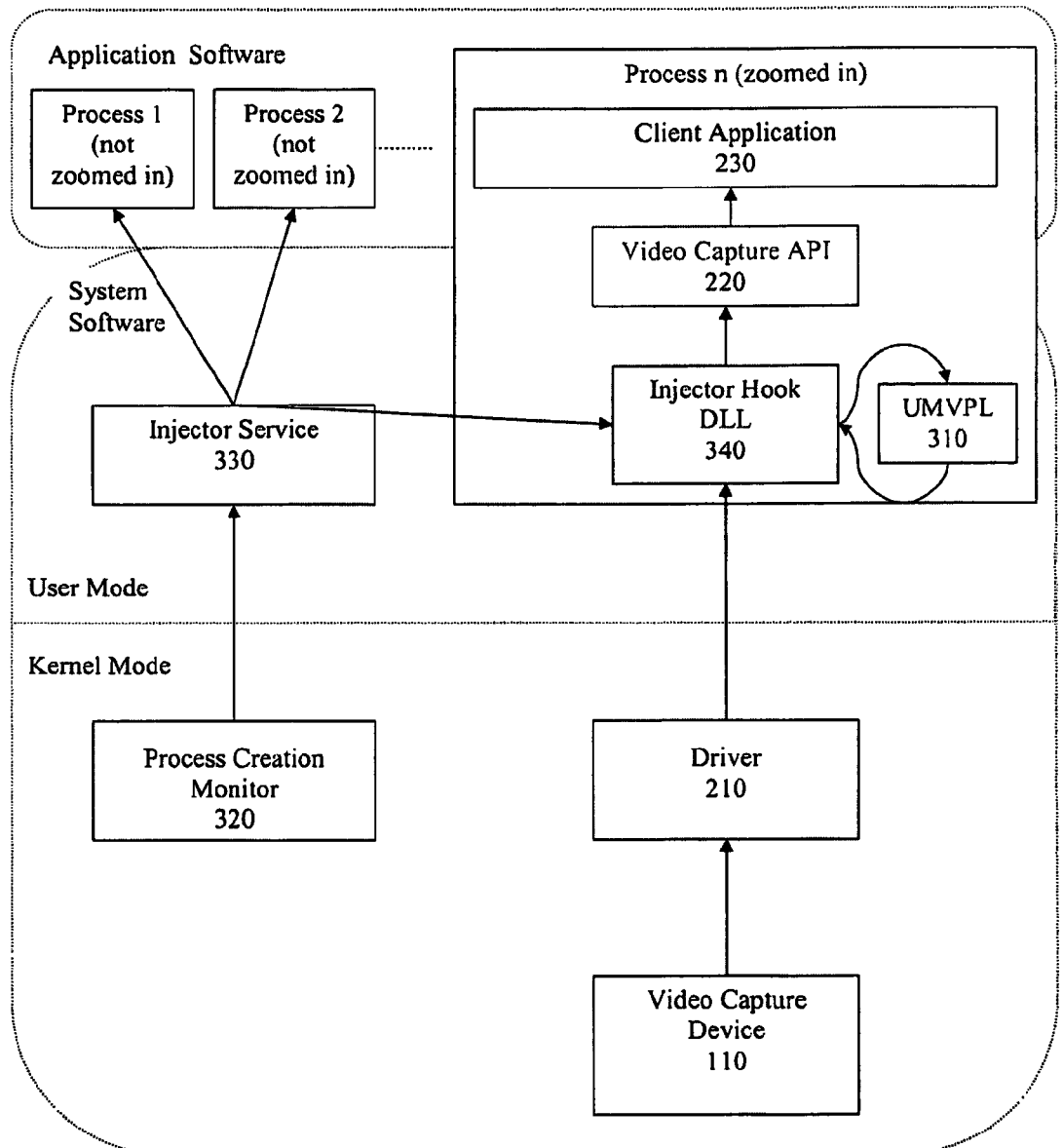
FIG. 3B is a block diagram illustrating the data flow in a system in accordance with an embodiment of the present invention.

FIG. 3B is a block diagram illustrating the data flow in a system in accordance with an embodiment of the present invention. Apart from the components discussed above with respect to FIG. 2B, it includes a Process Creation Monitor 320, 330 an Injector Service, and an Injector Hook Dll 340.

As discussed with reference to FIG. 2B above, a video data stream is generated by the video capture device 110 in one embodiment, is processed, and is eventually output to the client application 230. More generally, a system in accordance with various embodiments of the present invention accepts a multimedia data stream from a source, processes the stream, and outputs the result to a data sink. Examples of sources of the multimedia data include peripheral devices such as microphones, stand-alone video cameras, webcams, microphones embedded in video cameras, audio sensors, and/ or other video/audio capture devices. The data may also be provided by a client application 230 or converter. The data stream can comprise a file, and be provided from a portable storage medium such as a tape, disk, flash memory, or smart drive, CD-ROM, DVD, or other magnetic, optical, temporary computer, or semiconductor memory, and received over an analog 8 or 16 or more pin port or a parallel, USB, serial, firewire (IEEE 1394), or SCSI port. Or, it may be provided over a wireless connection by a Bluetooth™/IR receiver, Wireless USB, or various input/output interfaces provided on a standard or customized computer. The data stream may be dispatched to a data sink, such as a file, speaker, client application 230 or device (the same discussion about ports, storage and buses above applies for data sinks). The client application 230 can be any consumer that is a client to the source/sink 110. This could include a playback/recording application such as Windows Media Player from Microsoft Corporation (Redmond, Wash.), a communications application such as Windows Messenger from Microsoft Corporation (Redmond, Wash.), an audio editing application, a video editing application, or any other audio or other type of general or special purpose multimedia application. Client applications have also been discussed above in the context of FIG. 2A.

The data stream may be in any of a variety of formats. For instance, audio streams may be in a PCM or non-PCM format, wav format, mp3 format, compressed or uncompressed format, mono, stereo or multi-channel format, or 8-bit, 16-bit, or 24+ bit with a given set of sample rates. The data streams may be provided in analog form and pass through an analog to digital converter and may be stored on magnetic media or any other digital media storage, or can comprise digital signals. Video streams can also be compressed or uncompressed, and in any of a variety of formats including RGB, YUV, MJPEG, various MPEG formats (e.g., MPEG 1, MPEG 2, MPEG 4, MPEG 7, etc.), WMF (Windows Media Format), RM (Real Media), Quicktime, Shockwave and others. Finally, the data may also be in the AVI (Audio Video Interleave) format.

Referring again to FIG. 3B, when a client application 230 is opened, a process is created in the system. The Process Creation Monitor 320 monitors each process created, and notifies an Injector Service 330 whenever it detects the creation of a new process. This Injector Service 330 then injects a library of injector hooks (Injector Hook DLL 340) in this new process. In this manner, it is ensured that each process is injected with the Injector Hook DLL 340. These hooks, in turn, reroute each video data stream via the UMVPL 310 before the video data reaches its destination. In one embodiment, certain components are used by the Injector Hook DLL 340 to intercept the traffic between the driver 210 and the Video Capture API 220. In one embodiment, these components include KsUser.dll, Kernel32.dll, and NtDll.dll. KsUser.dll is the common library implementing the low level interface to the Windows Kernel Streaming components, Kernel32.dll is the common library implementing most of the low level Win32 functions and in particular the CreateFile() and DeviceIoControl() functions.whch are intercepted in one embodiment. NtDll.dll is the common library which acts as a gateway to the kernel world in Windows. In one embodiment, the Injector Hook Dll 340 intercepts calls between KsUser.dll and NtDll.dll and between Kernel32.dll and NtDll.dll. This is how access is gained to the video data and requests to open and close devices/streams are detected.

In one embodiment, audio and video data is simultaneously provided. IN such an embodiment, the UMVPL 310 and the UMVPL are both present, and depending on the type of data, the data is routed to via the injector hooks to the UMAPL or the UMVPL 310. That is, the type of data is assessed, and audio data is routed to the UMAPL, and video data is routed to the UMVPL 310.

Figure 4A:
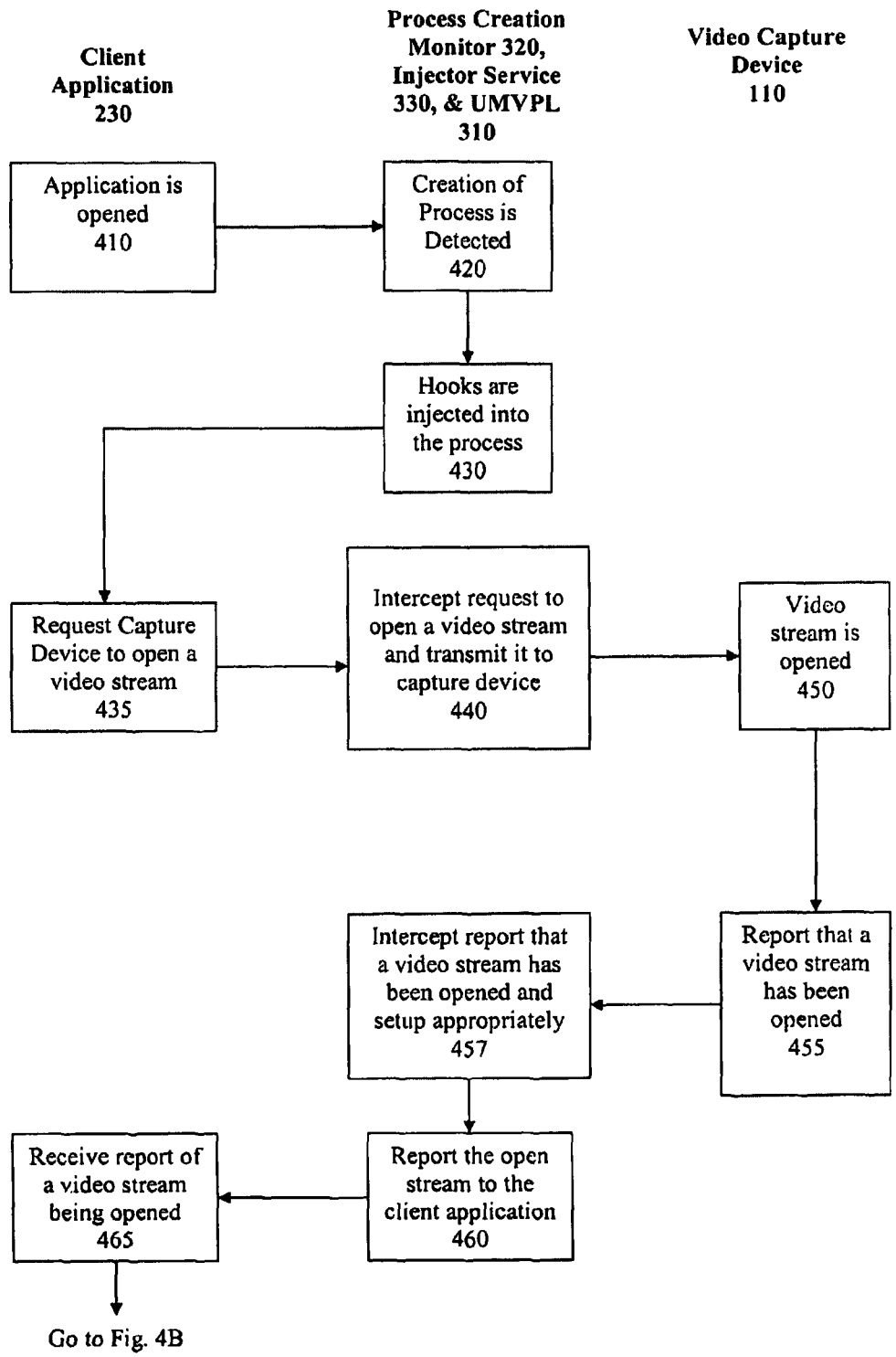
FIGS. 4A, B & C are flowcharts depicting a specific example starting with opening a client application, then opening a video stream to closing the stream, in a system in accordance with an embodiment of the present invention.

FIGS. 4A, B & C are flowcharts depicting a specific example starting with opening a client application 230, then opening a video stream to closing the stream, in a system in accordance with an embodiment of the present invention. The steps shown are taken by the client application 230, the Process Creation Monitor 320, the Injector Service 320, and the UMVPL 310, as well as the capture device 110.

As can be seen from FIG. 4A, when the client application 230 is opened (step 410), the creation of the process is detected (step 420) by the Process Creation Monitor 320. Hooks are then injected (step 430) into the process by the Injector Service 330. When the client application 230 requests (step 435) the capture device 110 to open a video stream, the UMVPL 310 intercepts this request and in turn transmits the request (step 440) to the capture device to open a video stream. The capture device 110 opens (450) the video stream. It also reports (step 455) that a video stream has been opened. This report is also intercepted (step 457), and appropriate setup is performed by the UMVPL 310. The UMVPL 310 then reports (step 460) the open stream to the client application 230. The client application thus receives (step 465) a report of the video stream being opened.

Figure 4B:
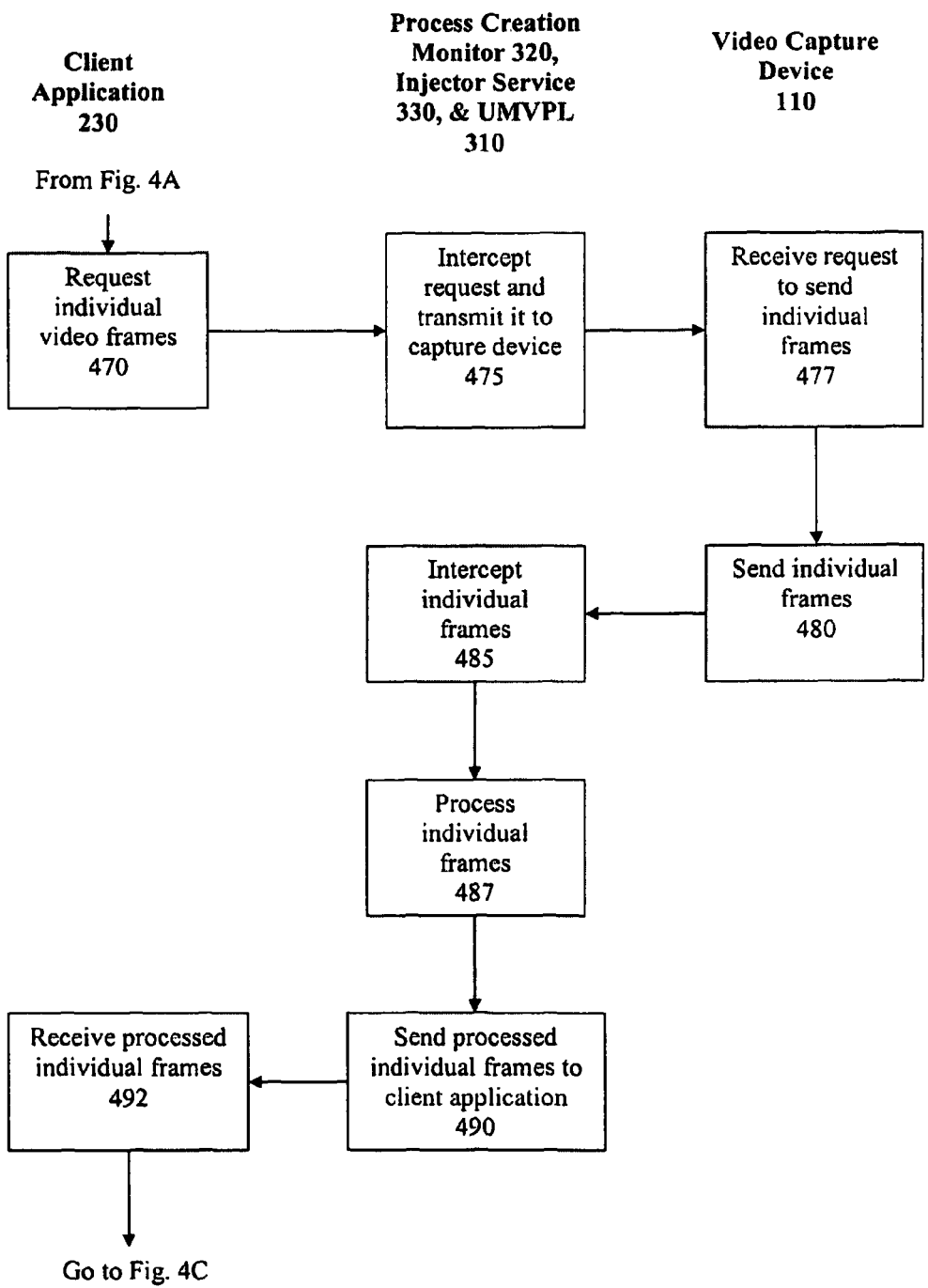

Referring now to FIG. 4B, it can be seen that the client application 230 now requests (step 470) individual video frames. Again, this request is intercepted (step 475) by the UMVPL, and then sent to the video capture device 110. When the video capture device receives (step 477) this request, it sends (step 480) individual video frames. These individual video frames are intercepted (step 485) by the UMVPL 310, and processed (step 487) by the UMVPL 310. Examples of such processing (step 487) have been provided above. These processed individual frames are then sent (step 490) to the client application 230. The client application receives (step 492) these processed frames.

Figure 4C:
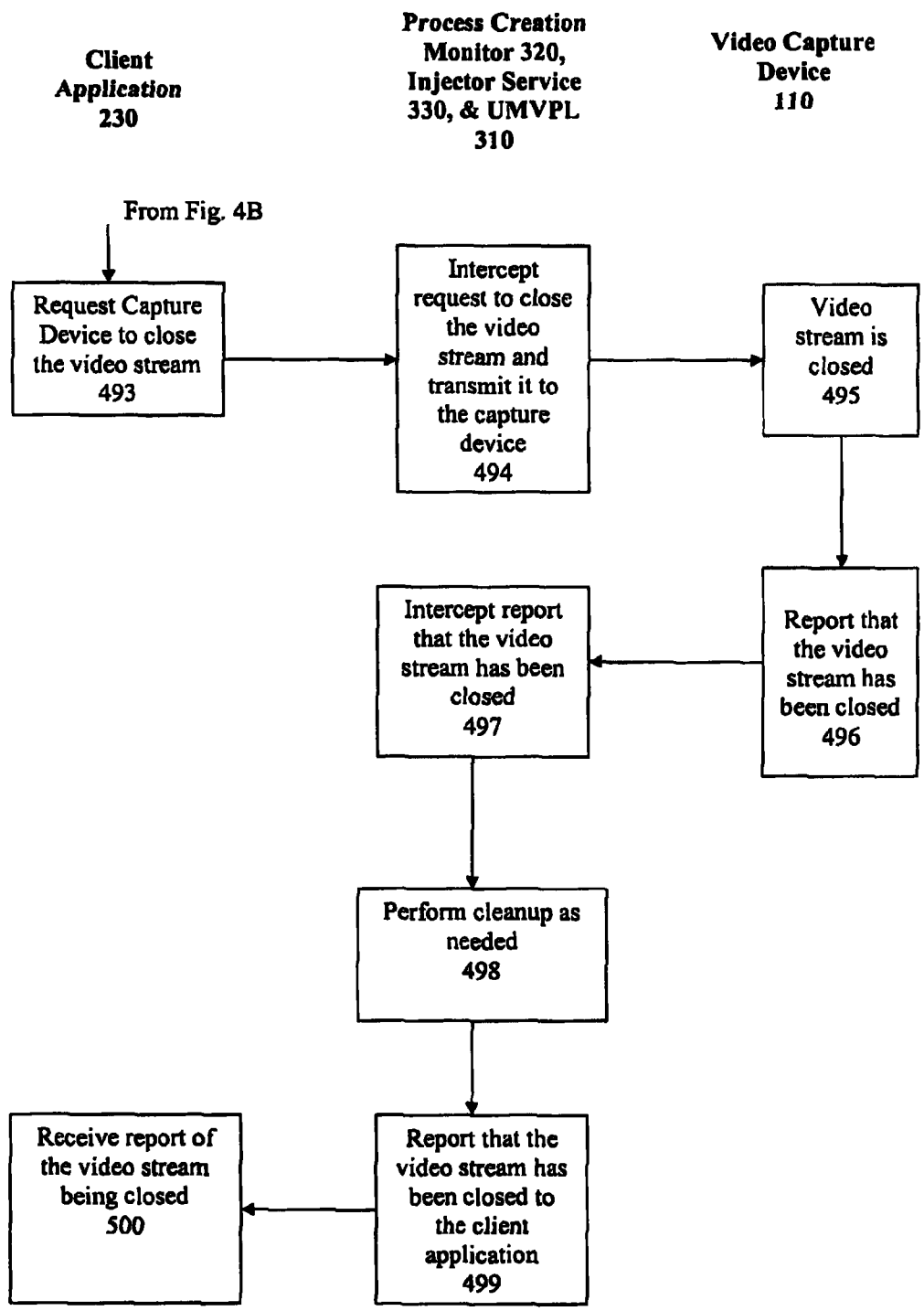

Referring to FIG. 4C, it can be seen that the client application 230 requests (step 493) the capture device 110 to close the video stream. This request is again intercepted by the UMVPL 310 and transmitted (step 494) to the capture device 110. The video stream is then closed (step 495) by the video capture device 110, and it is reported (step 497) that the video stream has been closed. This report is intercepted (step 497) by the video stream, and cleanup is performed (step 498) as needed. Finally, it is reported (step 499) by the UMVPL 310 that the video stream has been closed, and the client application 230 receives (step 500) this report.

Figure 5:
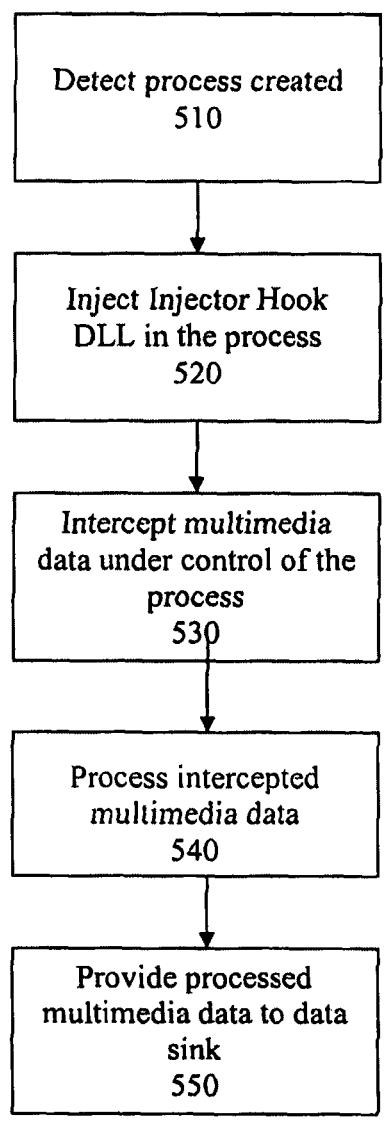
FIG. 5 is a flowchart that identifies in general, the steps taken by the process creation monitor, the injector service, and the UMVPL in accordance with an embodiment of the present invention.

FIG. 5 is a flowchart that identifies in general, the steps taken by a system in accordance with an embodiment of the present invention for each process created. Any process created is detected (step 510) by the process creation monitor 320. Injector Hook DLL 340 is then injected (step 520) in the process by the Injector Service 330. The multimedia data under control of the process is then intercepted (step 530) by the UMVPL 310. These multimedia data is then processed (step 540) by the UMVPL 310. The processed multimedia data is then provided (step 550) to the data sink.

In order to support a large variety of capture methods, in one embodiment, the video interception mechanism ('the interceptor') needs to be brought to the lowest level possible. Otherwise custom interception methods for each capture method would have to be devised, thus greatly increasing the complexity of the solution.

For this reason, in one embodiment, the video traffic is intercepted at the edge of the kernel, just before the data is sent or received to or from the capture driver. This, being the lowest point in the user-mode space, allows monitoring of various different video capture methods. This works because all WDM video capture devices use the same communication protocol to return data to the user mode client applications.

In one embodiment, the interception mechanism monitors the device and pin creation requests coming from client applications above; determines which created pins are of interest; monitors traffic to these pins by intercepting device I/O Controls sent to these pins; and stops monitoring the pins of interest when they are closed.

In one embodiment, while monitoring traffic to a pin, attention is paid to the creation format, 'set format' requests and to the read/write requests; each of these events having a direct impact on how and when the UMVPL processes video buffers.

The above interception mechanism is the first stage of the solution. The second stage, in one embodiment, consists in recreating an environment that the UMVPL can attach to. In one embodiment, such an environment is constructed in order to perfectly emulate the ksproxy host it currently attaches to, in order to minimize the changes needed to the UMVPL and eliminate any necessary changes to processing components. So in a way, this solution recreates a mini-DirectShow layer in order to enable re-utilization of the UMVPL implementation for other applications without any significant changes.

DirectShow (sometimes abbreviated as DS or DShow) is an application programming interface produced by Microsoft for software developers to perform various operations with media files. It is a replacement for Microsoft's earlier Video for Windows technology. Based on the Microsoft Windows Component Object Model framework, DirectShow provides a common interface for media across many of Microsoft's Programming Languages, and is an extensible, filter-based framework that can render or record media files on demand at the behest of the user or developer. The DirectShow development tools and documentation are distributed as part of the Microsoft Platform SDK. Applications such as Windows Media Player use DirectShow or a variation thereof to display content from a file or URL. DirectShow's most notable competition is RealNetworks' Helix Framework and Apple Computer's QuickTime framework.

In one embodiment, the interception mechanism causes the mini-DirectShow layer to initiate the appropriate requests in order for the UMVPL to process the video stream as expected.

Interceptor

When a process is created it is virtually impossible to know for sure whether or not that process is going to capture video. There are signs that confirm that a certain process will likely be capturing video, but there is no way of knowing that a given process will definitely not capture video. As a result, in one embodiment, the interception mechanism is inserted in almost all processes on the system with few exceptions. The installation of this interception mechanism in each process is referred to as 'injecting code.' In one embodiment, to address the above issues, the full interception mechanism is composed of 3 parts:

1. A kernel driver that monitors the creation of processes in the system and notify a client service when a new process is created ('Process Creation Monitor Driver').
2. A system service that receives the notifications from the kernel driver when a new process is created and then initiates the code injection mechanism in the newly created process ('Injector Service').
3. An Injector Hook Dll that represents the code injected by the injection mechanism. This DLL is in charge of deciding whether a process should be hooked, installing the interception hooks in the process if needed, and monitoring the video traffic through the installed hooks. That DLL also contains the mini-DirectShow layer but this layer does not pertain to the interception mechanism per say.

In this embodiment, any user mode video capture method is supported as long as it makes use of KsUser.dll to create the video capture pins on the WDM kernel device. All currently known video capture methods fall into this category. If some future video capture method were to not fall in this category the new version could be hooked as well to extend support to this new interface.

Figure 6:
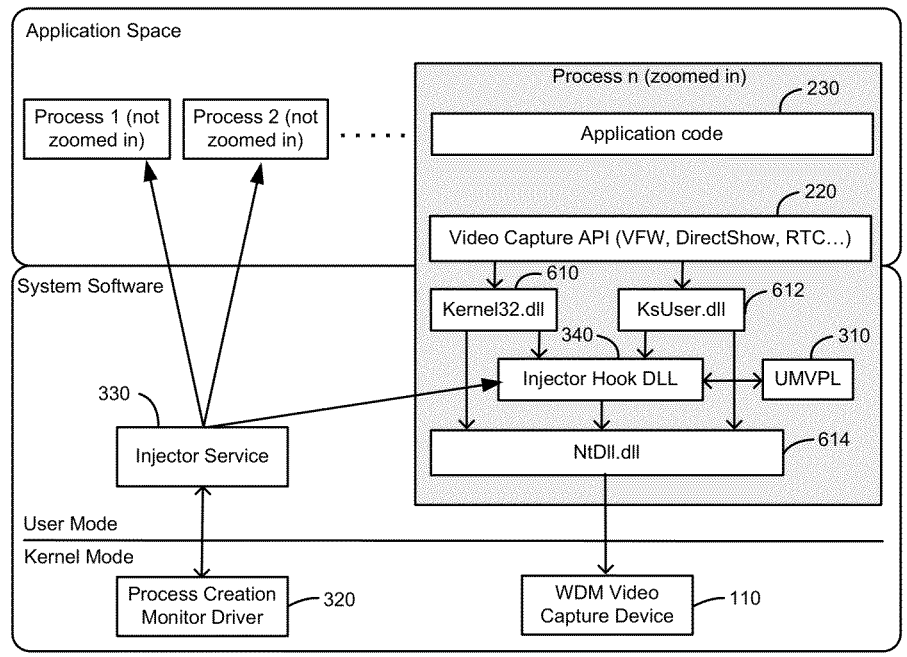
FIG. 6 is a diagram that shows the various components of an embodiment of the architecture and their relationships, with more detail than FIG. 3B with respect to the injector hook portion.

FIG. 6 is a diagram that shows the various components of the architecture and their relationships, with more detail than FIG. 3B with respect to the injector hook portion.

Data Flow

Figure 7:
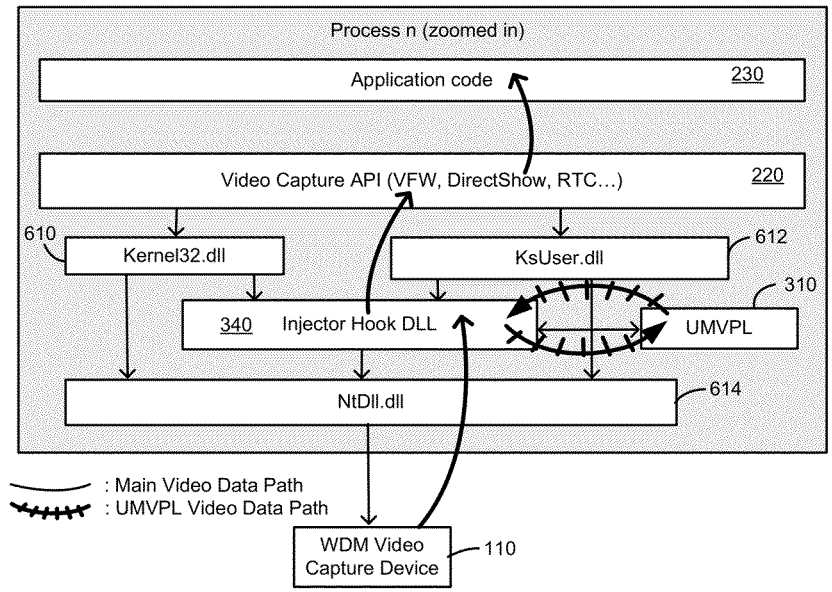
FIG. 7 is a diagram showing the typical data flow of a video frame in accordance with an embodiment of the present invention

FIG. 7 is a diagram showing the typical data flow of a video frame in accordance with an embodiment of the present invention.

Process Creation Monitor Driver 330 is in charge of monitoring the creation of new processes in the system and of reporting such creations to a client system service. This driver is not a WDM driver but rather a pure NT driver. It is installed as a SERVICE_KERNEL_DRIVER with a SERVICE_DEMAND_START start type. This driver will be started by the client service when the client service is started.

In order for the injector service 330 and the driver 320 to communicate, in one embodiment, a simple protocol is defined, which is composed of two IOCTL codes. In one embodiment, the first one only uses an output buffer composed of two DWORDs. The first DWORD will receive the PID of the new process upon completion, and the second will receive the Thread ID of the process primary thread upon completion. It is always completed asynchronously. In one embodiment, the second one only uses an input buffer. This input buffer is composed of a single DWORD which is the PID of the process that needs to be freed (see below). This request is always completed synchronously.

In one embodiment, the protocol functions as follows. The client service queues a number of first IOCTL code requests into the driver. All requests are kept pending until a process is created. Each time a process is created the driver de-queues one pending IOCTL (if there are no pending IOCTL it returns right away from the process creation callback), get the current thread id (which is the process initial thread id) and store both the PID and the thread id in the output buffer of the request. It then completes the request. After that it does not return from the process creation callback yet. It first creates an event on the stack, stores this event into a linked list indexed by PIDs and waits for a predetermined amount of time (e.g., 1 second) for the event to complete. It then removes the event from the linked list, and returns from the callback.

As soon as the first IOCTL code completes, the service will take the necessary actions to inject the code into the new process, and it will then send the second IOCTL code to the driver to let it know that it has completed the work on that process. Upon receipt of that IOCTL the driver will lookup the event associated with the PID (stored in the request) in the linked list of events, and if it finds the corresponding event it will signal it thus releasing the driver waiting in the callback. It then completes the IOCTL and returns.

The above protocol allows the client service to be notified as soon as a new process starts and gives a chance to the service to inject code into that new process before any code had a chance to run into that process. This minimizes the cases where the hooking mechanism would start late in its monitoring.

As explained below, in one embodiment, all IRPs that are held pending, are held in a cancel-safe IRP queue, so that the IRPs can be cancelled at anytime, in particular when the service process terminates.

Injector Service 330 receives the notifications from the kernel driver when a new process is started, and then it initiates the code injection mechanism in the newly created process. In one embodiment, this service is installed as a SERVICE_WIN32_OWN_PROCESS with a SERVICE_AUTO_START start type. In one embodiment, this service only supports Start and Stop, and does not support other commands such as Pause. Also, in one embodiment, to ensure that this service is loaded early enough in the boot process, so that no processes are missed, this service is added to the 'AudioGroup' Load Order Group. This group is loaded before any multimedia activity can start on the system. In one embodiment, the service is set to run in the Local System Account.

When the service starts, the first thing it does in one embodiment, is to start the kernel driver service. After the kernel driver has started, it opens the device created by the driver, and then creates five threads. Each thread queues a single first IOCTL to the driver. In one embodiment, no overlapped structures are passed. This will make each thread block until the completion of a request. Creating 5 threads is more efficient than just one with multiple overlapped requests pending as more than one request can be processed at the same time this way. In one embodiment, the service then waits for any of these requests to complete.

If the service needs to stop, CancelIo( ) is called to cause all pending IOCTL requests to be cancelled and returned. It then waits for all threads to complete (wait on the handle of the threads to signal). In one embodiment, when done, the thread handles and the device handle are closed.

When a thread's request completes, the successful completion of the request is verified. If not, and if the service is not stopping, another IOCTL request is re-queued. If the service is stopping, the thread is exited instead. In one embodiment, a mutex (mutual exclusion object) is used to prevent the service run state from changing while a thread is processing a completed request. Otherwise race conditions could occur causing a thread to never terminate.

If the request completed successfully, then the code injection mechanism is initiated as explained below, and a second IOCTL request is sent to the driver with the PID of the new process. In one embodiment, if the code injection fails, then the second IOCTL is still sent. Then if the service has not entered the stop state, the service queues another first IOCTL request to the driver.

Here is an explanation of how the code injection mechanism works in one embodiment of the present invention:
1. Open the target process with the following access rights: PROCESS_VM_WRITE, PROCESS_VM_OPERATION, PROCESS_CREATE_THREAD, PROCESS_QUERY_INFORMATION, and PROCESS_VM_READ.
2. Allocate a chunk of memory in the remote process. This chunk is large enough to contain the stub code to be injected. In one embodiment, this is done by using VirtualAllocEx( ). Specify MEM_COMMIT and PAGE_EXECUTE_READWRITE. It is important that the pages be marked as execute for this to work on processor supporting the NX technology.
3. Construct a small stub that pushes the address of a string (the full path of the DLL to load) on the stack, calls LoadLibraryA( ) and then returns popping four (eight for 64 bit platforms) bytes from the stack. The stub should be instantiated for it to work on the remote process. For this to work the string is packed at the end of the stub and the address of the string is thus easy to compute based on where the memory was allocated in the remote process. The address of LoadLibraryA( ) is the same in all processes at this time on all versions of Windows. This is because Kernel32.dll is always loaded at the same offset in the process space. This is done as a system wide optimization to speed up the loading of processes as all processes give or take a few all load Kernel32.dll. If this was to change, it would be easy to rebase this address using PSAPI to get the target process' kernel32.dll base address. Thus to get the address of LoadLibraryA( ) in the remote process use GetProcAddress( ) in the current process. Use GetModuleHandle( ) to find Kernel32.dll.
4. Copy the stub in the remote process using WriteProcessMemory( ).
5. Create a thread in the remote process using CreateRemoteThread( ). That thread should be made to start at the beginning of the stub.
6. Wait for the thread to complete by waiting on its handle, and then close the thread handle.
7. Free the remote memory, by calling VirtualFreeEx( ), passing MEM_RELEASE.
8. Close the process handle.

The above code executes a load library in the remote process, thus causing the selected DLL (here the Injector Hook DLL) to be loaded in the remote process. The DLLMain function of the DLL takes over from there, inserting all necessary hooks in the remote process (see next section). When the target process dies, the injected DLL will unload automatically.

In one embodiment, if it is found that the service cannot be made to be loaded early enough in the boot process to not miss any processes of interest, then the service is modified to start by enumerating all existing processes after the five threads have started. It does so with the PSAPI API. It then ignores its own process and the system process, and then proceeds to hook all the others.

Injector Hook DLL 340 is the DLL that is injected in each process by the Injector Service. This DLL is in charge of deciding whether a process should be hooked, installing the interception hooks in the process if needed, and monitoring the video traffic through the installed hooks. That DLL also contains the mini-DirectShow layer. That DLL is installed in a predetermined location, so that the Injector Service can easily locate it and build a full path string to it.

In one embodiment, this DLL has three distinct sections: the DLLMain startup code in charge of deciding whether or not the DLL should stay, of hooking the appropriate APIs in the process and of doing various other initialization/cleanup tasks; the Mini-DirectShow layer code; and the API hooks code.

The DLLMain Startup Code does most of its work in DLL_PROCESS_ATTACH. Some additional cleanup work is done in DLL_THREAD_DETACH and DLL_PROCESS_DETACH. No work is done in DLL_THREAD_ATTACH.

In the DLL_PROCESS_ATTACH, the following is done:
1. Call GetProcessWindowStation( ) followed by GetUserObjectInformation( ) with UOI_NAME to get the name of the Windows Station. If it is not "WinSta( )" then DLLMain( ) should return FALSE, causing the Library to unload.
2. Initialize monitored pins and filters linked lists.
3. Install hooks in Kernel32.dll (610 in FIG. 6) and KsUser.dll (612). To get access to these two DLLs, use LoadLibrary( ) and not GetModuleHandle( ). GetModuleHandle( ) only works with already loaded modules, but more importantly does not guarantee the module will stay loaded. Then install the following hooks by patching the import tables of these two modules as follows. For Kernel32.dll hook ntDeviceIo- ControlFile( ), ntCreateFile( ) and ntClose( ). For KsUser.dll hook ntCreateFile( ). Hooking here involves changing the address for these functions in the import table with the address of functions with the same prototype residing in our Injector Hook DLL. These functions will do what they have to do (see below) and then call the original handler that was originally in the import table.

4. Initialize any other internal structures as needed.
5. Return TRUE.

In the DLL_PROCESS_DETACH, the following is done:
1. Empty monitored pins and filters linked lists, taking care of destroying all associated objects as if we had detected an ntClose( ).
2. Unhook all hooked functions (make sure we went that far in DLL_PROCESS_ATTACH), by restoring the original handlers in the import tables and by calling FreeLibrary( ) once on each of the concerned DLL to undo our previous calls to LoadLibrary( ).
3. Free any other resources as needed.
4. Return TRUE.

Mini-DirectShow Layer:

As explained above the goal of this solution is to recreate an environment compatible with what the UMVPL is used to see so that the UMVPL can be loaded in that environment without any significant changes. For this to happen the Injector Hook DLL can create three objects (C++ classes) that derive from a certain number of standard DirectShow interfaces. One object emulates a filter object, another emulates a pin object and the last one emulates a Media Sample.

The filter object derives from IUnknown, IKsObject, IKsControl, IKsProperty, and IBaseFilter. The pin object derives from IUnknown, IKsObject, IKsControl, IKsProperty, Ipin and IMiniDShowPin. The Media Sample object derives from IUnknown and IMediaSample.

The IMiniDShowPin interface is proprietary. Because it is only used locally it does not need an IDL description. It is defined as an abstract class. It contains the following methods:
1. HRESULT SetDataFormat(AM_MEDIA_TYPE*pAMMediaType). This method remembers the current media format and calls IKsDataTypeHandler::KsSetMediaType( ) in the UMVPL.
2. HRESULT DataReceived(KSSTREAM_HEADER*pStream Header). This method fabricates a Media Sample object and then calls IKsDataTypeHandled::KsCompleteIoOperation( ) in the UMVPL. After that it destroys the Media Sample object by releasing its IMediaSample interface.
3. HRESULT DataSent(KSSTREAM_HEADER*pStreamHeader). This method fabricates a Media Sample object and then calls IKsDataTypeHandled::KsPrepareIoOperation( ) in the UMVPL. After that it destroys the Media Sample object by releasing its IMediaSample interface.

The following are examples of standard interfaces and methods to be implemented.
Interface Implemented Methods
Iunknown AddRef( ), Release( ), QueryInterface( )
IKsObject KsGetObjectHandle( )
IKsProperty Set( ), Get( ), QuerySupported( )
IKsControl KsProperty( ), KsMethod( ), KsEvent( )
BaseFilter No method implementation is needed.
IPin QueryDirection( ), QueryPinInfo( )
IMediaSample GetPointer( ), GetSize( ), IsPreRoll( ) (just return S_FALSE always), GetMediaType( ), SetMediaType( ), GetMediaTime( ), SetMediaTime( )

When the Filter object is created it receives the handle to the underlying object. This allows it to implement the interfaces it needs to implement. It is created with a reference count of one. To delete the object, just release any of its interfaces by just casting the object to one of its interfaces and calling interface->Release( ) thus causing the object reference count to reach 0.

When the Pin object is created it receives the handle to the underlying object, a pointer to the IBaseFilter of the underlying filter object, the current media format (AM_MEDIA_TYPE) and the pin index (which is used to get the name of the pin and its direction when needed). This allows it to implement the interfaces it needs to implement. It is created with a reference count of one. To delete the object, just release any of its interfaces by just casting the object to one of its interfaces and calling interface->Release( ) thus causing the object reference count to reach 0. When the object is deleted it releases the IBaseFilter interface it received in its constructor. Also when the object is created it aggregates with the UMVPL object by calling CoCreateInstance( ) with pUnkOuter set to the IUnknown of the Pin Object asking for the IUnknown of the UMVPL object. Remember to forward all QueryInterface( ) requests for unknown interfaces to the IUnknown of the UMVPL to make the aggregation complete. The pointer to the aggregated UMVPL object's IUnknown is released when the Pin object is destroyed. In addition the IKsDataTypeHandler interface of the UMVPL is also queried for upon creation. It is used to implement the IMiniDShowPin interface. In one embodiment, this interface is released right away to not keep a reference count.

When the Media Sample object is created it receives the address of the buffer, the size of the buffer, the media type, and the sample media time. This allows it to implement the interfaces it needs to implement. It is created with a reference count of one. To delete the object, just release any of its interfaces by just casting the object to one of its interfaces and calling interface->Release( ) thus causing the object reference count to reach 0.

API Hooks:

In one embodiment, there are four API hooks: ntCreateFile( ) from Kernel32.dll, ntCreateFile( ) from KsUser.dll, ntDeviceIoControlFile( ) and ntClose( ). When the ntCreateFile( ) hook for Kernel32.dll is called, the call goes through to the standard NtDll.dll (614 in FIG. 6) implementation. If it returns with a failure, nothing more is done. If it succeeds, the RootDirectory handle in the OBJECT_ATTRIBUTES structure is looked at. If it is not NULL, nothing more is done. If it is NULL, the file name in the ObjectName field of the OBJECT_ATTRIBUTES structure is looked at. If the name contains the GUID for KSCATEGORY_VIDEO or for KSCATEGORY_CAPTURE we continue, otherwise nothing more is done. Using the returned handle, a Device IOCTL is sent to query the KSPROPERTY_TOPOLOGY_CATEGORIES property of the object. If the request fails, nothing more needs to be done. If it succeeds, a check is conducted to see whether both KSCATEGORY_VIDEO and KSCATEGORY_CAPTURE are present. If not, then nothing more is done. If they are present, it is likely that the object is a Video Capture KS filter object, so the handle is remembered so that the object can be monitored. In one embodiment, this is done by creating a Filter Object in the Mini-DirectShow layer. This object is then cast into an IBaseFilter (there is already a reference count of one!), the handle is stored, and the IBaseFilter interface in a linked list ('the filter object linked list'). Then return.

When the ntCreateFile( ) hook for KsUser.dll is called, it signals the creation of a Ks Object. In one embodiment, the call first goes through to the standard NtDll.dll implementation. If it returns with a failure, nothing more is done. If it succeeds, the RootDirectory handle in the OBJECT_ATTRIBUTES structure is looked at. If it is NULL, nothing more is done. If it is not NULL, a check is performed to see whether the handle can be found in the filter object linked list. If not, nothing more is done. If it is found, the file name in the ObjectName field of the OBJECT_ATTRIBUTES structure is looked at. In one embodiment, this file name contains all the needed information. It is structured as: a GUID string followed by binary structures. If the GUID is not KSNAME_Pin then this was not a pin creation and nothing more is done. If on the other hand it is KSNAME_Pin, the following binary structure is looked at. In this case it should be a KSPIN_CONNECT. If the size is wrong, then we do nothing more. The pin index (PinId) in the KSPIN_CONNECT structure is extracted. Finally the creation format is extracted from the KSDATAFORMAT structure following the KSPIN_CONNECT (and stored in an AM_MEDIA_TYPE). If the size is wrong, nothing more is done. At this point, all the information needed to create a pin object is available: the handle, the IBaseFilter of the corresponding filter object (call AddRef( ) on it before giving it to the pin object constructor), the pin index and the current media format. This object is casted into an IMiniDShowPin (there is already a reference count of one!) and then the IMiniDShowPin and the pin handle is stored in a linked list ('the pin object linked list'). If this is the first object in the pin object linked list, the device IOCTL thread is started after initializing the device IOCTL event array of size MAXIMUM_WAIT_OBJECTS (all events are manual in one embodiment) and related structure arrays (see below). Then return.

When the ntClose( ) hook is called, a check is performed to see if the handle is in any of two linked lists. If it is, call Release( ) on the COM interface, remove the link list record and then delete the record. If this was the last object of the pin object linked list, then the IOCTL thread is stopped. In one embodiment, this is done by signaling the first event of the IOCTL event array (reserved for termination of the thread), and waiting on the handle of thread to signal. The thread handle is then closed and all events in the device IOCTL event array are also closed. In addition all related structure arrays are also freed as needed. Finally, call the original ntClose( ) implementation in NtDll.dll and return.

When the ntDeviceIoControlFile( ) hook is called, look at the handle. If the handle is not in the pin object linked list, call the original implementation in NtDll.dll and return. If the handle is the one of a pin that is monitored, then look further at the IOCTL request. If it is not a set format request, an IOCTL_KS_READ_STREAM or an IOCTL_KS_WRITE_STREAM request, call the original implementation in NtDll.dll and return. If it is a set format request, call the original implementation in NtDll.dll and if it succeeds, extract the format from the request and call IMiniDShowPin::SetDataFormat( ) to update the format in the UMVPL and related COM objects. Then return. If it is an IOCTL_KS_WRITE_STREAM request we call IMiniDShowPin::DataSent( ) for each of the headers present in the request (there could be multiple). Then call the original implementation in NtDll.dll and return. Finally, if it is an IOCTL_KS_READ_STREAM request, call the original implementation in NtDll.dll and if it succeeds, call IMiniDShowPin::DataReceived( ) for each of the headers present in the request (there could be multiple). Then return.

In some cases, requests can be asynchronous. In some cases, (e.g., IOCTL_KS_WRITE_STREAM) it does not matter whether the processing is done before the request is made. However, in other cases (e.g., IOCTL_KS_READ_STREAM), this matters. In one embodiment, this is dealt with in the following way: if there is an event handle in the Event parameter, it is replaced with a special event (allocated from the array of device IOCTL events. If there is no available event then nothing is done with this request) and the original event handle, the IoStatusBlock address, the pin handle, the type of operation (Read stream or set format) and a copy of the necessary information (headers or format) are stored in the structure attached with the special event. The original implementation in NtDll.dll is then called. If there is no event handle in the Event parameter, the request is completed synchronously as specified above.

For the above to work, a device IOCTL thread is needed. In one embodiment, that thread is started and stopped as defined above. The thread waits on all the events of the array of device IOCTL events at the same time with no timeout. When an event triggers, there are two scenarios. If it is the first event then the thread resets the event and exits. If it is any other event then the event is first reset. Then the IoStatusBlock is examined and if the IOCTL succeeded the data attached with the event is examined and the post IOCTL operation is completed as described in the synchronous description above. If the IOCTL failed no post operation is executed. The original event is then signaled and the special event is marked as available for another IOCTL. Finally the thread goes back to waiting on all events.

It is to be noted that in one embodiment, each time the filter or pin object linked list is looked up with the intention to use or delete the COM interface contained in it, the list is locked with a mutex, which is only released until after the operation on the COM interface is completed. Otherwise a COM interface could be deleted while being used, resulting in all sorts of interesting system crashes.

While particular embodiments and applications of the present invention have been illustrated and described, it is to be understood that the invention is not limited to the precise construction and components disclosed herein and that various modifications, changes, and variations which will be apparent to those skilled in the art may be made in the arrangement, operation and details of the method and apparatus of the present invention disclosed herein, without departing from the spirit and scope of the invention as defined in the following claims. For example, a system in accordance with the present invention could be used to manipulate/process still image media. Another example is that there could be more than one stream of multimedia data at any given time, with the different streams including different types of multimedia data (e.g., audio and video streams). In such a situation, two different processing layers (e.g., UMAPL and UMVPL) could be used simultaneously.

What is claimed is:

1. A client system for transparently processing multimedia data, comprising:
    a data source device for providing multimedia data; a data sink device for receiving the multimedia data; a process creation monitor for detecting a plurality of processes created by the client system;
    a user mode injection service for injecting with at least one hook at least one process detected wherein hooks are inserted for only a subset of service calls of said process; and
    a user mode processing layer on the data sink device to which the at least one hook redirects the multimedia data,
    wherein the process creation monitor is configured to notify the user mode injection service for each detected process, and the multimedia data is transparently processed before it reaches the data sink,
wherein the multimedia data that is processed includes audio data and video data, and
wherein said user mode injection service hot patches software in memory of the client system.

2. The system of claim 1 wherein said video data is intercepted at the edge of a kernel, just before the data is sent or received to or from a capture driver.

3. The system of claim 2 wherein said video data is intercepted by:
monitoring device and pin creation requests coming from client applications above;
determining which created pins are of interest;
monitoring traffic to pins of interest by intercepting device I/O Controls sent to these pins; and
stopping monitoring the pins of interest when they are closed.

4. The system of claim 3 wherein said monitoring traffic to pins further comprises:
monitoring creation formats, 'set format' requests and read/write requests.

5. The system of claim 1, wherein the data source is a webcam.

6. The system of claim 1, wherein the data source includes a microphone.

7. The system of claim 1, wherein the multimedia data includes still image data.

8. The system of claim 1, wherein the data sink is a client application.

9. The system of claim 8, wherein the client application is an instant messaging application.

10. The system of claim 1 wherein the multimedia is transparently processed by performing one or more special effects to the multimedia data.

11. The system of claim 10 wherein the special effects include at least one of channel mixing, silence buffer, noise suppression, noise cancellation and notch filtering, distortion, morphing, or spoofing.

12. The system of claim 10 wherein the special effects to be performed are specified by a user.

13. The system of claim 1, wherein the multimedia is transparently processed by performing one or more special effects to the multimedia data, and
wherein the special effects include at least one of color correction, image distortions and alterations, color keying, video avatars, face accessories, stream preview, spoofing, or a rain-drop effect.

14. The system of claim 1 wherein the data sink device is a host device.

15. The system of claim 1 wherein the data source and the data sink are part of the same device.

16. A method for processing multimedia data, wherein the multimedia data is provided by a data source, and the multimedia data is received by a data sink, where the processing is transparent to both the data source and the data sink, the method comprising:
detecting a plurality of processes created in a client system;
notifying a user mode injection service of each of the plurality of detected processes;
injecting, in user mode, at least one hook into a selected process;
inserting said hooks for only a subset of service calls of said selected process;
routing, via the at least one hook, the multimedia data under control of the process to a processing layer;
processing the routed multimedia data in the processing layer in user mode; and
providing the processed multimedia data to the data sink,
wherein the multimedia data that is processed includes audio data and video data, and
wherein said injecting includes providing hot patches to software in memory of the client system.

17. The method of claim 16 wherein said video data is intercepted at the edge of a kernel, just before the data is sent or received to or from a capture driver.

18. The method of claim 17 wherein said video data is intercepted by:
monitoring device and pin creation requests coming from client applications above;
determining which created pins are of interest;
monitoring traffic to pins of interest by intercepting device I/O Controls sent to these pins; and
stopping monitoring the pins of interest when they are closed.

19. The method of claim 18 wherein said monitoring traffic to pins further comprises:
monitoring creation formats, 'set format' requests and read/write requests.

20. The method of claim 16, wherein the multimedia data includes still image data.

21. The method of claim 16 wherein processing the routed multimedia data includes performing one or more special effects to the multimedia data.

22. The method of claim 21 wherein the special effects include at least one of channel mixing, silence buffer, noise suppression, noise cancellation and notch filtering, distortion, morphing, or spoofing.

23. The method of claim 21 wherein the special effects to be performed are specified by a user.

24. The method of claim 16, wherein the multimedia is transparently processed by performing one or more special effects to the multimedia data, and
wherein the special effects include at least one of color correction, image distortions and alterations, color keying, video avatars, face accessories, stream preview, spoofing, or a rain-drop effect.

25. The method of claim 1 wherein the system is a host device.

26. The method of claim 16 wherein the data source is on a different device than the data sink.

27. The method of claim 16 further comprising:
determining whether the process should be hooked; and
injecting, in user mode, at least one hook into the process based on the determination that the process should be hooked.

28. The method of claim 16 wherein said plurality of detected processes includes at least one process that does not include multimedia data.

29. A method for processing multimedia data comprising:
detecting a plurality of processes created in a host system;
notifying a user mode injection service of each of the plurality of detected processes;
injecting, in user mode, at least one hook into a selected process, wherein hooks are inserted for only a subset of service calls of said process;
routing, via the at least one hook, multimedia data under control of the process to a processing layer;
processing, in user mode, the routed multimedia data in the processing layer to perform one or more special effects; and providing the processed multimedia data to a data sink,
wherein the multimedia data that is processed includes audio data and video data, and
wherein said injecting includes hot patching software in memory of the host system.

30. The method of claim 29 wherein special effects include at least one of color correction, image distortions and alterations, color keying, video avatars, face accessories, stream preview, spoofing, or a rain-drop effect.

31. The method of claim 29 wherein special effects include at least one of channel mixing, silence buffer, noise suppression, noise cancellation and notch filtering, distortion, morphing, or spoofing.

32. The method of claim 29 wherein the one or more special effects are specified by a user.

33. The method of claim 29 wherein said plurality of processes includes at least one process that does not include multimedia data.

34. A client system for transparently processing multimedia data, comprising:

a data source device for providing multimedia data;
a data sink device for receiving the multimedia data;
a process creation monitor for detecting a plurality of processes created by the client system;
a user mode injection service for injecting with at least one hook at least one process detected wherein hooks are inserted for only a subset of service calls of said process; and
a user mode processing layer on the data sink device to process the multimedia data which the at least one hook redirects processed multimedia data,
wherein the process creation monitor is configured to notify the user mode injection service for each detected process, and the multimedia data is transparently processed before it reaches the data sink,
wherein the multimedia data that is processed includes video data and audio data, and
wherein said user mode injection service hot patches software in memory of the client system.

* * * * *